United States Patent [19]

Lee et al.

[11] 4,057,481

[45] Nov. 8, 1977

[54] HIGH PERFORMANCE, QUALITY CONTROLLED BIPOLAR MEMBRANE

[75] Inventors: Lester T. C. Lee; Gerald J. Dege, both of Parsippany; Kang-Jen Liu, Somerville, all of N.J.

[73] Assignee: Allied Chemical Corporation, Morris Township, N.J.

[21] Appl. No.: 689,305

[22] Filed: May 24, 1976

[51] Int. Cl.² .......................................... C25B 13/08
[52] U.S. Cl. ................................................... 204/296
[58] Field of Search ........................................ 204/296

[56] References Cited

U.S. PATENT DOCUMENTS

| | | | |
|---|---|---|---|
| 3,388,080 | 6/1968 | de Korosy et al. | 204/296 X |
| 3,868,314 | 2/1975 | Mizutoni et al. | 204/296 |
| 3,887,499 | 6/1975 | Hodgdon | 204/296 X |

Primary Examiner—F.C. Edmundson
Attorney, Agent, or Firm—Arthur J. Plantamura; Ernest A. Polin

[57] ABSTRACT

Improved novel single film bipolar membranes having an ion selectivity above 80% in an electrolyte medium of about one mole, are prepared containing a relatively high amount, i.e. at least 15% of an insoluble cross-linked aromatic polymer. Before the styrenated sheet is chemically functionalized, the film surface is specifically treated, i.e. cleaned to make it more receptive to functional groups, so that the cationic-exchange groups and anion-exchange groups can be introduced homogeneously from each side of the surface-cleaned film, and a single-film bipolar membrane of superior durability, stability, and quality control results.

16 Claims, 4 Drawing Figures

HIGH PERFORMANCE, QUALITY CONTROLLED BIPOLAR MEMBRANE

CROSS-REFERENCE TO RELATED APPLICATIONS

The subject matter of this application relates to subject matter disclosed in U.S. patent application of G. J. Dege and K. J. Liu, Ser. No. 645,848, filed Dec. 31, 1975, entitled "Single Film, High Performance Bipolar Membrane" and in the U.S. patent application of L.T.C. Lee and K.-J. Liu filed on even date herewith Ser. No. 689,304, entitled "Preparation of High Performance Polyelectrolyte Membrane."

BACKGROUND OF THE INVENTION

The present invention is directed to the preparation of bipolar membranes possessing both low electrical resistance and superior performance properties, durability, and high reproducibility. In particular, the invention relates to the preparation of the single film bipolar membranes involving, specifically, the surface treatment to remove the excess skin layer formed during the introduction of styrene and divinylbenzene on to the polymeric matrix system. Thereby the subsequent functionalization of the film with cationic groups and anionic groups may result in a substantially improved quality control and membrane uniformity.

Various ion exchange membranes, cationic and anionic, individually as well as laminae membranes, are well known in the art. Styrene-divinylbenzene copolymers with sulfonic acid ion exchange groups (cation-type) are fully disclosed, e.g. in U.S. Pat. No. 2,731,411. The anion-type, for example a styrene-divinylbenzene vinylpyridine membrane, is disclosed in U.S. Pat. No. 2,860,097. Cation and anion membranes based on polyethylenestyrene copolymers bonded together in a hydraulic press under heat and pressure to form two-ply membrane structures are also known as shown, for example in U.S. Pat. No. 3,372,101. Such membranes generally have the disadvantage of high electrical resistance, incurred during fusion; are prone to bubble or blister; and only operate at relatively low current densities, for short time periods, all of which render them unattractive for commercial electrodialysis operations.

Some single film bipolar membranes have also been disclosed. For example, some have been obtained by hydrolyzing one side and aminating the other side of a chlorosulfonated polyethylene sheet, as diclosed in U.S. Pat. No. 3,388,080. Membranes thus prepared, however, are relatively inefficient in that they have high voltage drops across them. Another single-film bipolar membrane, of the polyethylene-styrene divinylbenzene type, is disclosed in the Leitz U.S. Pat. No. 3,562,139. The latter membranes are designed specifically for desalination by electrodialysis, wherein, the direction of electrical current flow is periodically reversed. Such membranes behave asymmetrically transferring mainly cations when the cationic lamina of the membrane faces the cathode and transferring mainly anions when the anionic lamina faces the cathode. To the degree that any water splitting could be effected using the membrane described by Leitz in U.S. Pat. No. 3,562,139, the current efficiency of the contemplated desalination process would be decreased. Moreover, the membranes of U.S. Pat. No. 3,562,139 have only a relatively low level of cross-linking (approximately 0.5% active divinylbenzene) which results in relatively inferior ion selectivity.

Also membranes of the kind disclosed in U.S. Pat. No. 3,562,139 possess design features, such as (a) a cation exchange group internal molality less than the anion exchange group internal molality, and (b) an anionic layer which is thinner than the cation layer, both of which aid the transport of the electrolyte through forbidden areas, i.e., against the Donnan exclusion forces, and possess only relatively low current efficiencies (50–70% desalination) at low electrolyte concentrations (0.03–0.06N) and current densities (8–25 amp.ft$^2$).

Thus, while the preparation of low cross-linked, low ion-selective polyethylene-polystyrene bipolar membranes has been achieved, it is particularly difficult to obtain bipolar membranes with a relatively high number of cross-linking bonds, high functional group concentrations, high ion-selectivities, and yet have low membrane voltage drops and long operational capabilities at relatively high current densities and electrolyte concentrations. This invention discloses methods for obtaining single film bipolar membranes with these advantages and with excellent reproducibility and quality control.

SUMMARY OF THE INVENTION

The primary object of this invention is to prepare single film bipolar membranes which comprise a matrix of a polymeric film in intimate dispersed relationship with a cross-linked aromatic polymer which is prepared by introducing monomeric styrene onto a matrix material and, subsequently, polymerized together with divinylbenzene to form a highly cross-linked three-dimensional system within the matrix. Since each styrene molecule is a potential site for functionalization, the proper distribution of the cross-linked polystyrene within the matrix will be highly important for the performance and quality control of the resulting bipolar membrane. While deficient styrene contents yields a membrane of high electrical resistant, excess styrene on the other hand may cause heterogeneity in functionalization. This heterogeneity is due especially to the thin skin layer formed on the surface of the film which sometimes prevents and/or retards the further functionalization of the film into bipolar membranes.

By affirmatively removing the undesirable surface skin layer, the dissociable cationic exchange groups may be more readily and uniformly introduced from one side of the film, while anion exchange groups are introduced from the opposite side. The relatively uniformity in functionalization is easily appraised visually or microscopically by dyeing the membranes. A membrane manufactured in this manner functions particularly advantageously as a durable water-splitting membrane to generate acid and base from dissolved salts by electrodialysis with substantially improved effeciency at both high electrolyte concentrations, i.e. several molar and current densities, such as 100–400 amp./ft.$^2$ or greater.

Membranes prepared in accordance with the invention introduce a substantial advantage in the art of reproducibility and quality control of bipolar membrane preparation and manufacturing. The resulting membranes are less prone to blister, are essentially nonporous and permit only low salt diffusion across them. The invention is especially advantageous in the preparation of membranes which are densely structured where a high degree of cross-linking and aromatic content is essential; membranes thus prepared are less brittle, have little or no degradation, have excellent strength and durability, and are stable for long periods of time.

Additional objects will become apparent from the disclosure which follows.

The single film bipolar membrane compositions of the present invention are prepared from a single polymeric film, such as, polyethylene, polypropylene, etc., and intimately contains at least 15% by weight, based on the total weight of dry membrane, of an aromatic nuclei containing polymer, such as polystyrene, poly-α-methylstyrene, etc., which is suitably cross-linked with a di- or poly-functional cross-linking agent, such as, divinylbenzene or its equivalent. Subsequently the excess polystyrene on the surface of the membrane matrix thus prepared is thoroughly removed before functionalization was initiated. By so doing, the improvement of uniform introduction onto the matrix film of cationic groups and anionic groups from each side of the film is more readily achieved.

Disclosed herein are the conditions and procedures used to obtain membranes which not only have improved performances especially for water-splitting during electrodialysis, but also possess excellent strength and durability.

BRIEF DESCRIPTION OF THE DRAWING

The figures of the drawing show the effect of the surface layer on the membrane film on the bipolar membrane preparation.

DETAILED DESCRIPTION OF THE INVENTION

Figure 4:
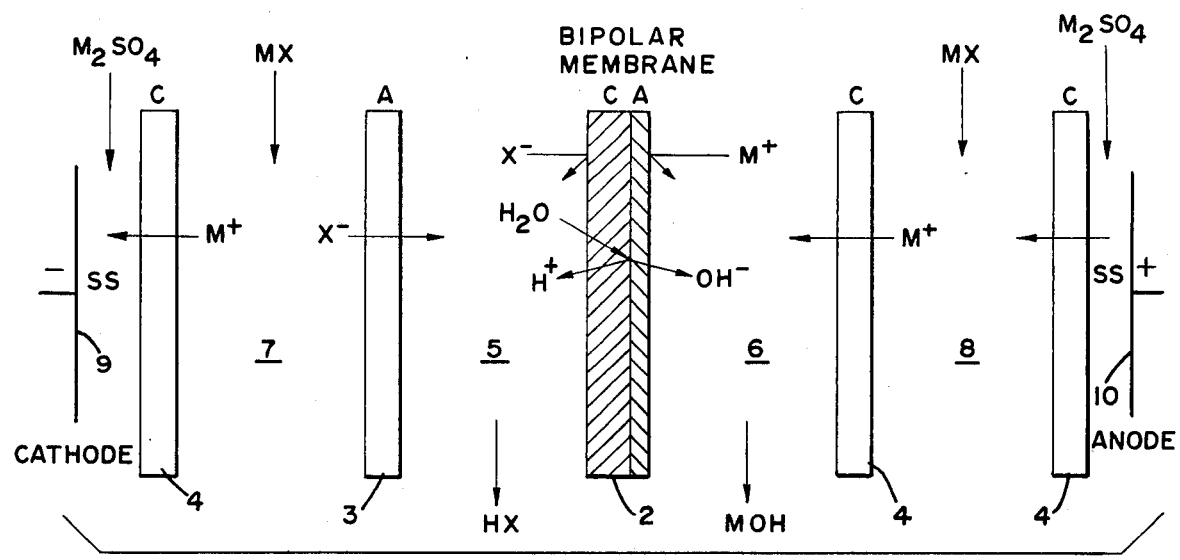
FIG. 4 is an illustration of a cross-section of a single-film bipolar membrane positioned schematically in a typical electrodialysis cell together with conventional anionic and cationic permeable ion exchange membranes.

In FIG. 4 a typical arrangement utilizing the bipolar membrane prepared in accordance with the invention is illustrated. As shown, a bipolar membrane 2 is depicted schemactically as a water-splitter in an electrodialysis cell. Acid and base flow through compartments on opposite sides 5 and 6 of the bipolar membrane 2, which are also bounded by anion permeable and cation permeable ion exchange membranes 3 and 4, respectively. Salt solution, MX, passes through the adjacent compartments 7 and 8 which are separated from the electrode compartments 9 and 10, containing a salt solution such as $M_2SO_4$ solution, by additional cation exchange membranes 4. Under the influence of a direct electric current, anions ($X^-$) and cations ($M^+$) within the bipolar membrane migrate out of the membrane toward the anode and cathode, respectively, and in the vicinity of the interface their concentrations rapidly decline. At this point continued passage of the electric current can only occur by the transfer of $OH^-$ and $H^+$ ions produced by the dissociation of water ("water-splitting") at the interface. Naturally, the membranes must be sufficiently water permeable in order to replace water molecules consumed by the reaction; otherwise the membrane will "burn-out." Current efficiencies for the production of acid and base using membranes of the invention varied from 79-92% and 66-82% respectively, at a current of 163 ma/cm$^2$ (150 amp./ft.$^2$) and electrolyte concentration of about 9-11% acid and base. These are higher ranges than had been normal in the prior art, e.g. 24 amp./ft.$^2$ and 0.1N solutions or less. In addition, in the use of membranes of the invention only negligible amounts of salt, MX, were found in the acid, indicating very low diffusion of base through the membrane.

The composition of the high performance, quality controlled single film bipolar membrane is based on three components:

1. the matrix material: The prime function of the matrix material is to impart mechanical properties into the resulting membrane and as a carrier of the polyelectrolyte groups;

2. polystyrene (or its equivalent): Each aromatic group in the polystyrene chain is a potential site for functionalization to anionic or cationic groups; and 3. cross-linking by divinylbenzene (or its equivalent): It is essential to have a three-dimensional cross-linked network in the membrane composition so that the polyelectrolytes will be insolubilized, and the resulting membrane will have a fixed structure, good performance and longer life-time.

Many variables associated with the preparation of the high-performance, quality controlled single film bipolar membrane have been systematically investigated. Films with low polystyrene content i.e. about 15% in total aromatic, the result in bipolar membrane had high electrical resistant. Films with low cross-linking contents, i.e. about 2% DVB in the styrenating mixture, were found to blister easily. Therefore, a film with higher content of polystyrene and cross-linking content is essential for the preparation of the desired high performance bipolar membranes. A styrene content of about 35 to 45% by weight were the most desired level, and the styrenation mixture containing about 5-15% cross-linking divinylbenzene were of common use. At these high degree of polystyrene level coupled with high degree of cross-linking contents, it was found that it is necessary to styrenate and polymerize the films for two or more times. During this practice, it was discovered that a thin skin of dense cross-linked polystyrene was formed on the matrix film surface which may inhibit diffusion of chlorosulfonic acid and caused the resulting membranes to have high voltage drops and poor performance. After effectively removing the surface polymer skin layer, which has not penetrated the matrix film surface, according to the present invention by using various means e.g. scraping, sanding, mechanical wiping and/or solvent cleaning, the sulfonation and amination were smoothly carried out with excellent uniformity, yielding membranes with excellent performance, and low voltage potential of about 1 volt and less (at 100 amp./ft.²) with excellent quality control.

After the films were prepared with specific surface treatment wherein the excess polystyrene is affirmatively removed from the surface, the film is pre-swelled in a solvent before the sulfonation and subsequent chloromethylation and amination are carried out. Films so treated were yielded relatively high and about equal concentrations of both ion exchange groups to provide a membrane with low voltage drop and minimum salt leakage. Also, the durability of the film whose surface prior to functionalization is precleansed, is attested to by the fact that some of the membranes have run continuously in a large electrodialysis cells for long periods of time (over several months) at 100 amp./ft.² with no lessening in performance and only modest increases in potential. The resulting membrane so prepared with precleansed surface possess low resistances which allow the use of high current densities (100–150 amp./ft.² or above) and electrolyte concentrations and exhibit high current efficiencies. The membranes are particularly suited for industrial water-splitting applications in which high performance is a prerequisite.

The matrix film employed in preparing the bipolar membrane of the present invention may comprise any of the polymers derived from monomers selected from the group consisting of

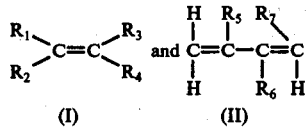

wherein $R_1$ and $R_7$ are substituents selected from the group consisting of hydrogen, chlorine, fluorine, alkyl radicals of 1 to 5 carbon atoms and phenyl radicals and copolymers thereof, and chlorinated and fluorinated polymers and copolymers thereof. Typical of polymers derived from the formulae (I) and (II) are polyethylene, polypropylene, polybutene-1, poly-3-methyl-1-butene, poly-4-methyl-1-pentene, poly-4-methyl-1-hexene, polystyrene, polyvinylidene fluoride, polybutadiene, polyisoprene, polychloroprene, polyisobutylene, polytrifluorochloroethylene, polytetrafloroethylene, and the like and copolymers thereof, and chlorinated and fluorinated polymers and copolymers thereof.

Films of various densities, such as low density, high density, or ultra-high molecular weight polyethylene may be used, but it is important that the film have a homogeneous rheological structure in order to obtain uniform membranes. To afford active sites the film is impregnated with a mixture of an aromatic nuclei containing monomer and a suitable cross-linking agent or in lieu of a chemical cross-linking agent subjected to well known cross-linking conditions. Prior to polymerization all of the excess liquid polymerizate should be removed from the film's surface in order to ensure subsequent uniform functionalization.

The aromatic monomers which are intimately dispersed and polymerized on the matrix film composed of the monomeric compounds of the above formulae (I) and (II) are those of the formula

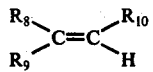 (III)

wherein $R_8$, $R_9$ and $R_{10}$ are substituents selected from the group consisting of hydrogen, alkyl radicals of 1 to 4 carbon atoms, phenyl substituted alkyl radicals of 2–4 carbon atoms, phenyl, phenoxy-, thiophenoxy, and naphthyl radicals and the hydroxyl-, alkoxyl-, and halo-substituted phenyl, phenoxy, thiophenoxy, and naphthyl radicals and mixtures thereof and wherein at least one substituent is an aromatic radical. Illustrative of such compounds are styrene or its nuclear and/or alpha-substituted derivatives, such as α-methyl styrene, α-ethyl styrene, α,β-dimethyl styrene, 4-phenyl-butene-1, α-chlorostyrene, α-bromostyrene, 2-chloro-styrene, 2-bromostyrene, 2-fluorostyrene, 2-hydroxy-styrene, 2-methoxy-styrene, vinyl naphthalene, vinyl phenylethers, and vinyl phenyl sulfides. The weight ratio of the matrix film and the aromatic component should be adjusted so as to ensure an ion exchange capacity of the final membrane of about 1.4–6.0 meg/g. In the case of styrene from about 15 to 70% of the impregnated film should preferably be cross-linked polystyrene.

The aromatic polymer on the substrate is cross-linked sufficiently to prevent substantial dissolution or swelling of the membrane when it is immersed in solvents in which the membrane is to be primarily used, e.g. aqueous acid and base solutions. Cross-linking methods which may be used include any of the well known mechanisms, such as chemical or radiation, either singly or in combination; illustrative of cross-linking systems are the use of polyvinyl compounds, such as divinylbenzene, and substituted derivatives thereof, such as nuclear and/or alpha-substituted derivatives, e.g., divinyl toluene, α,α'-dimethyl divinylbenzene, α, α'-dimethyl divinyltoluene, divinylnaphthalene, divinylxylene, divinylethylbenzene, divinylchlorobenzene, trivinylnaphthalene, trivinylbenzene, divinylphenylether, divinylsulfone, divinylacetlene, and also radiation, such as electron beam. Preferably a cross-linking agent such as divinylbenzene (DVB) may be used. DVB is available commercially as a mixture containing 55% divinylbenzene isomers and about 45% ethyl vinylbenzene as the main components. The mole ratio of the aromatic compound to the cross-linking agent can vary from about 112:1 to 9:1, corresponding to about 2–20% commercial divinylbenzene in the styrene mixture.

A preferred membrane in the present invention is that prepared from the polyethylene-polystyrene-divinylbenzene system; utilized as a typical composition in describing the preparation of membranes according to the invention.

EXAMPLES 1 - 14

General Procedure — In preparing the membrane the initial polyethylene film was first examined between crossed polaroid sheets for non-uniformities, such as gels, strains, disorientations or the like. The uniformity of the film's thickness was measured with a micrometer. The films were supported in stainless steel troughs containing the aromatic vinyl monomer mixture of the selected mole ratio of vinyl aromatic monomer and cross-linking agent, e.g. styrene/divinylbenzene/benzoyl peroxide (initiator), and at the desired temperature. Immersion in the vinyl aromatic monomer, e.g., styrenation is conducted for a time period necessary to attain sufficient impregnation of the film, which is dependent upon its thickness and morphology, as well as, the styrenating temperature.

In impregnating the substrate film with the vinyl aromatic monomer, temperatures at or above which the film softens to an undesirable degree are to be avoided. Generally for mixtures containing 5-15% DVB, styrenations were carried out at 70°-94° C. for time periods of about 10 minutes to 1 hour. Following styrenation, the film is removed from the bath, excess styrene removed from its surface, and it is then pressed between aluminum foil covered glass plates and polymerized at 70°-95° C. for 18-24 hours. In order to obtain styrene contents of about 40-60% the procedure may be repeated. After each polymerization, surface skin layer of polystyrene is removed by sanding, mechanical wiping or solvent cleaning.

In Examples 1 to 12 on Table I, the surface abrading was effected by sanding using 320 grit sand paper. The styrenated and cross-linked polyethylene film was held tightly by clamping onto a smooth surface area, then a sand paper with 320 grits per square inch manufactured by Carborundum Co. was used first to remove the heterogeneous skin layer on the film surface. After the surface was cleaned completely, the films were polished with a sand paper with 550 grits per square inch. Afterward, the sand-off particles were washed off from the film surface.

In Examples 13 and 14 on Table I, the surface abrading was effected by solvent-wiping. After each styrenation and polymerization, the film was first immersed in a solvent such as 1,2-dichloroethane or carbon tetrachloride for 24 hours, then the surface skin layer was removed by using a rough textured cloth saturated with the solvent.

Films in which the surface had been cleaned and thereby freed of material or surface accumulations which hindered homogeneity of functionalization, were also obtained by using a wiper to remove the liquid polystyrene from the film surface immediately after styrenation and before polymerization. Irradiation of the film after styrenation with a high energy source will also yield films with clean surface.

Prior to sulfonation, the cross-linked film is preswollen in a solvent, inert to, but at least partially miscible with the sulfonating agent or mixture for about 24 hours. Chlorosulfonations may be run at room temperature with chlorosulfonic acid-solvent mixtures ranging from 10-100% chlorosulfonic acid.

The reaction is started on one side of the film only and its progress through the film toward the opposite side is controlled and may be followed by microscopic examination of stained (methylene blue), microtomed, cross-sections. The interface between the reacted and unreacted layers is linear, parallel to the sides of the film and very sharp, attributed to both the homogeneity of the film and that the reaction is apparently diffusion-controlled. Extensive chlorosulfonation and chloromethylation plus quaternization may be observed by both chemical analysis and microscopic examination and indicates the concentrations of both functional groups in the final membrane are nearly equal.

In addition, it is observed from resistance measurements (1 kc, AC bridge) of sections removed at various time intervals of sulfonation reaction, that the resistance is relatively high, ranging from 1000 to 10,000 ohm-cm$^2$. due to the remaining unfunctionalized layer, until just before the reaction reaches the opposite side, at which point it suddenly falls to very low values, indicating the membrane is becoming wholly cation permeable as determined by microscopic examination of stained thin sections. It is apparent that one skilled in the art may use any fraction of this time interval to locate the interface at any desirable position across the film's thickness.

Once the partially chlorosulfonated film is hydrolyzed with dilute (1N) sulfuric acid, neutralized with a 0.1N KOH and 5% KCl mixture, rinsed free of excess electrolyte with distilled water, and dried, it is then ready for chloromethylation. In lieu of drying, the film may be treated with several portions of solvent such as carbon tetrachloride. The chloromethylation is conducted by immersing the films into chloromethylmethylether containing 2.5% by weight, SnCl$_4$, and refluxing (59° C.) for about 6 hours under nitrogen. The film is then removed and quaternized in a 25% solution of trimethylamine in acetone at 25° C, for about 20 hours. The single film bipolar membrane so obtained is equilibrated in 1N potassium fluoride at 25° C. for 48 hours, with stirring. Microtomed thin sections may be stained with either a cationic dye (methylene blue) and/or an anionic dye (methyl orange), and have been observed to compliment each other, with a sharp interface between them.

TABLE I

The Preparation & Potential Drops for High Performance & Reproducible Single-Film Bipolar Membranes

| Example No. | Film Composition | | | Surface Abrading Method | Chloro-Sulfonation (min.) | Quater-nization Agent | % Cationic Layer | Voltage Drop | |
|---|---|---|---|---|---|---|---|---|---|
| | matrix film | % polystyrene | % divinyl benzene | | | | | Eo | Em |
| 1 | 10 mil UHMW-PE | 43.2 | 10.0 | Sanding | 320 | Me$_3$N | 91 | 0.77 | 1.16 |
| 2 | 10.5 mil UHMW-PE | 43.0 | 10.0 | Sanding | 310 | Me$_3$N | 56 | 0.77 | 1.13 |
| 3 | 10 mil UHMW-PE | 46.0 | 7.5 | Sanding | 285 | Me$_3$N | 90 | 0.78 | 1.18 |
| 4 | 10 mil UHMW-PE | 36.2 | 7.5 | Sanding | 295 | Me$_3$N | 83 | 0.78 | 1.14 |
| 5 | 10 mil UHMW-PE | 39.0 | 7.5 | Sanding | 290 | Me$_3$N | 85 | 0.77 | 1.10 |
| 6 | 11 mil UHMW-PE | 38.0 | 7.5 | Sanding | 290 | Me$_3$N | 81 | 0.77 | 1.10 |
| 7 | 10 mil UHMW-PE | 38.9 | 7.5 | Sanding | 290 | Me$_3$N | 85 | 0.79 | 1.10 |
| 8 | 10 mil UHMW-PE | 38.2 | 7.5 | Sanding | 290 | Me$_3$N | 86 | 0.77 | 0.94 |
| 9 | 10 mil UHMW-PE | 35.7 | 7.5 | Sanding | 290 | Me$_3$N | 81 | 0.77 | 1.05 |
| 10 | 10 mil UHMW-PE | 43.0 | 7.5 | Sanding | 290 | TXMDA-$^1$ Me$_3$N | 85 | 0.78 | 1.21 |
| 11 | 10 mil UHMW-PE | 40.0 | 7.5 | Sanding | 295 | TXMDA-$^2$ Me$_3$N | 90 | 0.71 | 1.63 |
| 12 | 10 mil UHMW-PE | 46.7 | 7.0 | Sanding | 310 | Me$_3$N | 85 | 0.79 | 1.02 |
| 13 | 10 mil UHMW-PE | 36.0 | 15 | Solvent | 330 | Me$_3$N | 81 | 0.79 | 1.03 |

TABLE I-continued

The Preparation & Potential Drops for High Performance & Reproducible Single-Film Bipolar Membranes

| Example No. | Film Composition matrix film | % polystyrene | % divinyl benzene | Surface Abrading Method | Chloro-Sulfonation (min.) | Quaternization Agent | % Cationic Layer | Voltage Drop Eo | Voltage Drop Em |
|---|---|---|---|---|---|---|---|---|---|
| 14 | 10 mil UHMW-PE | 43.3 | 7.5 | Wiping Solvent Wiping | 280 | Me₃N | 79 | 0.78 | 0.90 |
| 15 | 10 mil UHMW-PE | 45.0 | 7.5 | Rubber[3] Wipers | 320 | Me₃N | 90 | 0.78 | 0.88 at 109ma/cm² |

[1]TXMDA- is tetramethylxylylenediamine
[2]TMPDA- is tetramethylpropyldiamine
[3]plastic or metallic wipers may also be used Sulfonations may also be accomplished by means of such known reagents as (a) sulfuric acid, (b) sulfur trioxide, or (c) oleum, or (d) mixtures thereof. Chloromethylation may also be conducted by the following reagents (a) $SO_2Cl_2$ with methylal and a Friedel-Crafts catalyst or (b) formaldehyde and hydrochloric acid.

Figure 1:
FIG. 1 is a photograph of one of the styrenated films without surface treatment. The polyalkylene matrix sheet is a 10 mil ultra-high molecular weight polyethylene film, treated three times with styrene, 10% divinylbenzene and 0.5% benzoyl peroxide mixture and polymerized and heated in a saturated magnesium sulfate solution. The total polystyrene-DVB content of the film is 42%. After the film was swollen with carbon tetrachloride, and treated with 65% chlorosulfonic acid in carbon tetrachloride for 280 minutes, the heterogeneity of the chlorosulfonation was clearly shown on the surface of the membrane as shown by A, and the resulting bipolar membrane had a high voltage drop (11.2 volts at 1.2 amp.).
Figure 2:
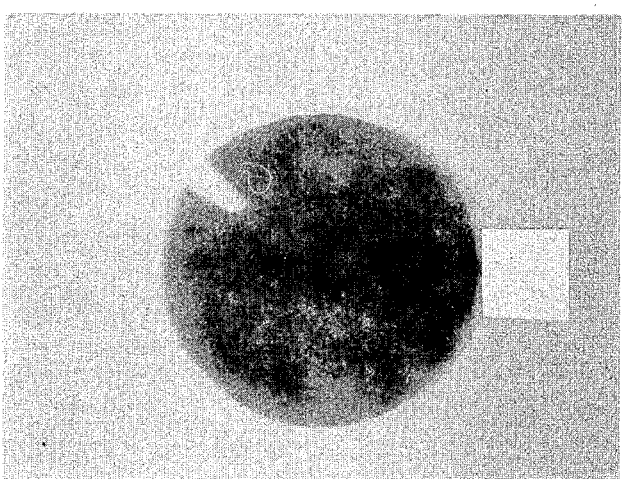
FIG. 2 is a photograph of the identical film as in FIG. 1 in which the surface is cleaned by sanding. After similar treatment with chlorosulfonic acid, the sulfonation is uniform and homogeneous, the resulting bipolar membrane as shown in FIG. 3 has low voltage drop (0.97 volts at 1.2 amp.) and has good stability for long periods of time.
Figure 3:
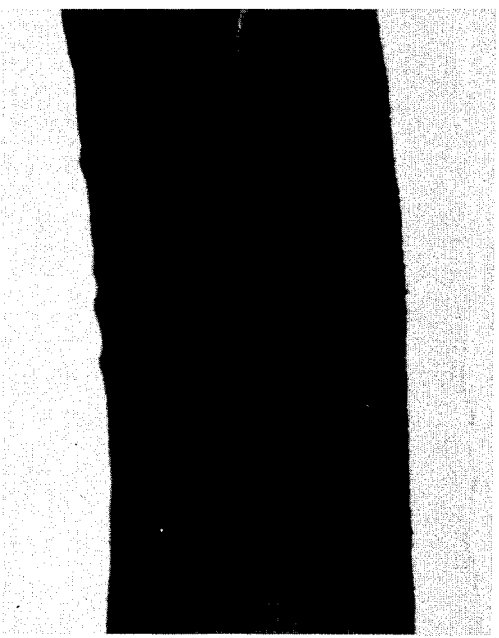
FIG. 3 is a microscopic photograph of a cross-section of a bipolar membrane made from a surface-cleaned polystyrene-divinylbenzene (DVB) film.

Electrical Sensitivity — The voltage drop across the bipolar membrane is determined in a six-cell electrodialysis cell, FIG. 1, containing platinum electrodes in each end compartment, across which a direct current may be applied from a D.C. power source, (e.g. Hewlitt-Packard Model No. 6289A). The bipolar membrane is mounted between the two center cells with its anion permeable side contacted with a 1N KOH electrolyte solution and facing the anode and its cation permeable side contacted with 1N HCl solution and facing the cathode. 1N KCl is used in the two adjacent cells, with 5% $K_2SO_4$ in the two end electrode compartments. Two Luggin tips (saturated KCl in agar-agar) are positioned in the center of the two middle cells, about 2 mm from the opposite faces of the bipolar membrane. The other ends of the Luggin tips are immersed in saturated KCl solutions containing two Calomel electrodes which are connected to as voltmeter. The voltage drop across the 1N HCl and 1N KOH solution between the Luggin tips was determined in separate measurements, averaged, and subtracted from the voltage drop measured with the bipolar membrane in position. The voltage drop across the bipolar membrane was then measured at various current dentisites, e.g. 1.8–165 ma/cm² (1.7–154 A/Ft²) and the results plotted. Since about 0.75 volts are required to split water, voltages in excess of this value are due to the resistance of the bipolar membrane itself. In addition, at no current flow the voltage drop, Eo, across the bipolar membrane is generally about 0.75–0.80 volts.

The final single film bipolar membrane had a potential drop across it of 1.07 at 109 ma/cm² (DC) when measured in an electrodialysis cell with 1N KOH and 1N HCl next to its anionic and cationic permeable sides, respectively. Its potential drop at zero current flow (Eo) was 0.81 volts, indicative of the fact that it is bipolar and functions as a water-splitter. When the bipolar membrane was placed in an electrodialysis cell with 10% HCl and 10% KOH on opposite sides of the membrane at 163 ma/cm² (DC), it was found to have a base current efficiency of 74% and an acid current efficiency of 83% and in the acid at only 0.5%, i.e. sa = 0.5%. This membrane was run continuously for 66 days as a water-splitter at 77–91 ma/cm² (DC) at 30° C. of NaHSO₃ solution (9%) with no loss in its performance characteristics and only a modest increase in its potential drop.

Various modification may be made within the scope of the invention without departing from the scope of the appended claims.

What we claim is:

1. In a process for manufacturing a high performance, durable single film bipolar membrane having an ion selectivity above 80% in an electrolyte medium of at least 0.1 molar from a single film wherein an olefinic polymeric film matrix in uniformly impregnated with a mixture of a vinylaromatic monomer and a di- or polyfunctional cross-linking agent and said mixture is subsequently polymerized to obtain on the film at least 15 percent by weight of the vinylaromatic mixture based on the total weight of the membrane and said mixture is cross-lined to a degree equivalent to that obtained by a 2 to 20 weight percent of divinylbenzene in styrene, the improvement comprising pre-cleaning the thus prepared cross-linked matrix and thereby removing surface vinylaromatic polymer accumulation, which has not penetrated the matrix surface, from the surface of the cross-linked matrix to render the aromatic nuclei of the impregnated vinylaromatic polymer more readily accessible to functionalization, and thereafter chemically bonding from about 5 to about 98% of the membrane thickness with highly dissociable cationic exchange groups to the aromatic nuclei from one side only, and chemically bonding from about 2 to 50% of highly dissociable anionic exchange groups to the remaining aromatic nuclei.

2. The process of claim 1 wherein the olefin film is polyethylene.

3. The process of claim 1 wherein the olefin film is polypropylene.

4. The process of claim 1 wherein the olefin film is a polyethylene-polypropylene copolymer.

5. The process of claim 1 wherein the matrix film is polytrifluorochloroethylene.

6. The process of claim 1 wherein the concentration of the aromatic nuclei containing polymer comprises from about 20 to about 70% based on the total weight of the membrane.

7. The process of claim 1 wherein the surface cleaning is effected by sanding the surface.

8. The process of claim 1 wherein the surface cleaning is effected by solvent wiping to remove the excess surface resin accumulation.

9. The process of claim 1 wherein the functionalizing reagent comprises a sulfonic acid group selected from the group comprised of sulfonic acid, $SO_3$, oleum, chlorosulfonic acid, or mixtures thereof.

10. The process of claim 8 wherein the sulfonic acid group is obtained by chlorosulfonating with a solution of chlorosulfonic acid in carbon tetrachloride with at least 53% chlorosulfonic acid by volume and thereafter hydrolyzing the sulfonated reaction produced.

11. The process of claim 8 wherein the cationic functional groups are derived by chlorosulfonation and the chlorosulfonating agent comprises a mixture of chlorosulfonic acid and dichloroethane or trichloroethane.

12. The process of claim 1 characterized in that the functionalizing reagent comprises a quaternary trimethyl amine anionic exchange groups obtained by chloromethylation with reagents selected from the group consisting of (a) $SO_2Cl_2$ with methylal and a Friedel-Crafts catalyst, (b) formaldehyde and hydrochloric acid, and (c) chloromethyl methylether and tin tetrachloride; followed by quaternization with an organic solution of a trialkyl amine.

13. The product produced by the method of claim 1.
14. The product produced by the method of claim 7.
15. The product produced by the method of claim 8.
16. The product produced by the method of claim 9.

UNITED STATES PATENT AND TRADEMARK OFFICE
CERTIFICATE OF CORRECTION

PATENT NO. : 4,057,481

DATED : November 8, 1977

INVENTOR(S) : Lester T. C. Lee, Gerald J. Dege & Kang-Jen Liu

It is certified that error appears in the above-identified patent and that said Letters Patent are hereby corrected as shown below:

Col. 1, lines 36-37, "polyethylenestyrene" should be
-- polyethylene-styrene --.

Col. 2, line 47, "relatively" should be -- relative --.

Col. 3, line 63, "schemicatically" should be
-- schematically --.

Col. 10, Claim 1, line 30, "cross-lined" should be
-- cross-linked --.

Signed and Sealed this

Twenty-seventh Day of June 1978

[SEAL]

Attest:

RUTH C. MASON
Attesting Officer

DONALD W. BANNER
Commissioner of Patents and Trademarks